Patented Oct. 19, 1948

2,452,001

UNITED STATES PATENT OFFICE 2,452,001

PHENANTHRIDINIUM COMPOUNDS AND METHOD OF MAKING THEM

Leslie Percy Walls, Teddington, England, assignor to The Imperial Trust for the Encouragement of Scientific and Industrial Research, Westminster, England No Drawing. Application September 2, 1944, Serial No. 552,579. In Great Britain September 4, 1943

14 Claims. (Cl. 260—286)

This invention in a general sense relates to novel chemotherapeutic agents and to processes of preparing the same; more specifically it is concerned with carboxyamido-phenanthridine derivatives having trypanocidal potency and with novel processes for obtaining the same.

As a result of research and experimentation, it has been found, pursuant to the present invention, that the new products obtainable by the conversion into carbalkoxyamido or other carboxyamido ester groups of the amino group or groups in amino phenanthridinium salts, possess valuable therapeutic properties. An important class of such new bodies can be regarded as the quaternary ammonium salts of phenanthridine compounds of the general formula:

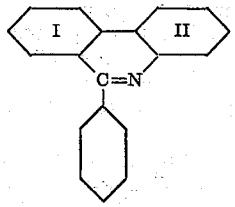

in which one or both of the fused benzene rings I or II and also the 9-phenyl radical contain the substituent grouping NHCOOR, where R represents a substituted or unsubstituted hydrocarbon radical, for example an alkyl or aryl group. More specifically, the radical R may be a methyl, ethyl or phenyl group.

These new phenanthridinium compounds are valuable therapeutic agents. In general, they possess activity against the trypanozome *T. congolense* and certain of them have the valuable additional property of therapeutic activity against the trypanozome *T. cruzi*. This latter organism is responsible for human trypanosomiasis in South America and is remarkably resistant to almost all known trypanocidal drugs. Preferred compounds of the present invention are quaternary ammonium salts of those phenanthridine derivatives that possess the basic structures:

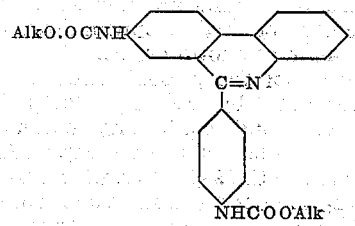

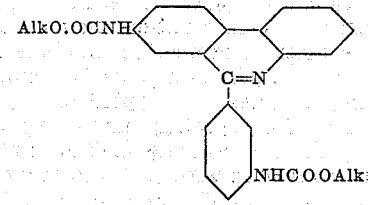

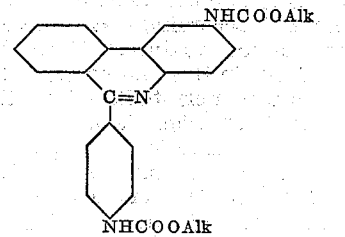

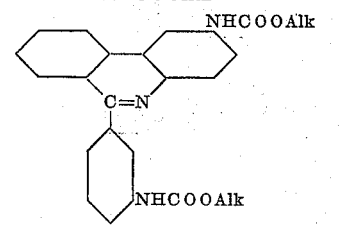

Specific examples are 7-carbethoxyamido-9-p-carbethoxyamidophenyl - 10 - methylphenanthridinium chloride, 7-carbethoxyamido-9-m-carbethoxyamidophenyl-10 - methylphenanthridinium chloride, the corresponding 3-carbethoxyamido compounds and the corresponding methane sulphonates.

Further specific compounds within the purview of this invention are the 2:7-dicarbethoxyamidoand 3:7-dicarboxyamido-9 - phenyl - 10 - methyl phenanthridinium chlorides which are representative of the species having the formulae:

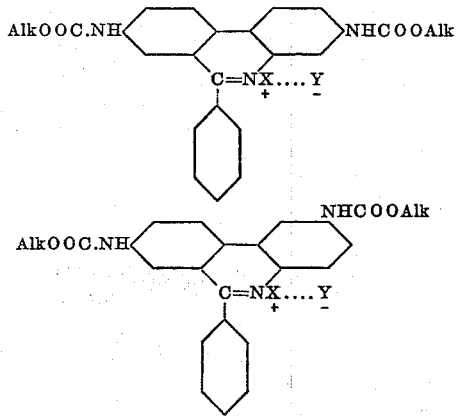

as well as the mono-carbethoxyamido compounds such as, for example, 9-m-carbethoxyamido-10-methylphenanthridinium chloride.

These new compounds are prepared, according to the present invention, from the corresponding aminophenanthridines or aminophenanthridinium salts (including those containing m-aminophenyl or p-aminophenyl in the 9-position), which aminophenanthridines and aminophenanthridinium salts are themselves obtained from the corresponding nitrophenanthridine compounds in manner known per se.

The process of the present invention may be carried into effect by treating an aminophenanthridine compound containing either an m-aminophenyl radical or a p-aminophenyl radical as substituent in the 9-position with a haloformic ester having the desired ester group (for example a chloroformic ester such, for example, as ethyl chloroformate). Quaternation may be effected prior to or after esterification, but the former procedure is to be preferred since it is more convenient and more readily adapted to large-scale manufacture. An especially important feature of the process lies in reacting the initial phenanthridinium compound with a haloformic ester in aqueous suspension. The reaction is a heterogeneous one and accordingly it is necessary to agitate the reaction mixture. When the reaction is carried out in this manner, a clean product is obtained which crystallises from the reaction mixture in a very high yield.

One specific embodiment comprises stirring aqueous solutions of the amino salts with a small excess of a chloroformic ester. The resultant reaction is illustrated by the following equation which is specific to Example I hereof:

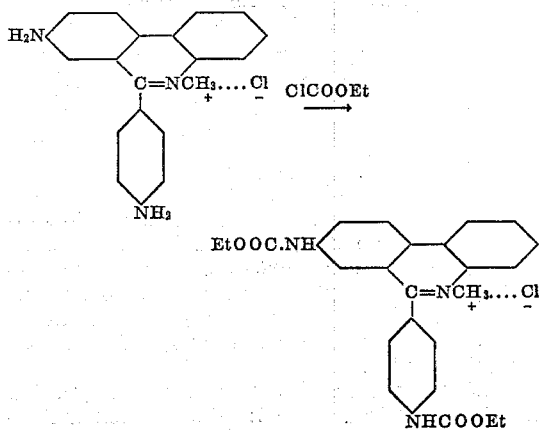

The new drugs are stable, crystalline salts soluble in water: unlike the amino compounds from which they are derived, they are only slightly coloured. This latter property is one of substantial practical importance in regard to the administration of the drugs.

The process of the present invention is illustrated by the following examples:

*Example I*

2 parts by weight of 7-amino-9-p-aminophenyl-10-methylphenanthridinium chloride were dissolved in 50 parts of water by warming. The solution was cooled and shaken vigorously with 2 parts of ethyl chloroformate (about 20% excess of theoretical). The colour of the solution diminished and after a few minutes yellow crystals began to separate. After being heated to complete the reaction, the reaction mixture was cooled, and the dicarbethoxyamido-salt collected by filtration. It crystallises from water in transparent yellow prisms in good yield; M. P. decomp. 239°. The temperatures in this and the following examples are in degrees centigrade and are corrected. The melting-decomposition points of this and similar salts described in the following examples are indefinite and dependent on the rate of heating.

Similarly 7-carbethoxyamido-9-m-carbethoxyamidophenyl-10-methylphenanthridinium chloride can be prepared from the corresponding diamino salt (described in my co-pending application Serial No. 543,969). This new salt is soluble in water but cystallizes best from ethyl alcohol in bright yellow microscopic needles, M. P. decomp. 219°.

*Example II*

3-amino-9-p-aminophenyl-10-methylphenanthridinium chloride was similarly converted into 3-carbethoxyamido - 9 - p-carbethoxyamido - 10-methylphenanthridinium chloride, a pale buff-coloured salt, which crystallised from a large volume of water in small buff-coloured needles, M. P. decomp. 261°. A much more soluble salt can be obtained by conversion into the methane-sulphonate; an equivalent of silver methanesulphonate was added to an aqueous solution of the chloride, and the filtrate from precipitated silver chloride was evaporated to small bulk. The residual liquor on being cooled deposited transparent yellow prisms of the desired salt, M. P. decomp. 264°.

Similarly 3-carbethoxyamido-9-m-carbethoxyamidophenyl-10-methylphenanthridinium chloride can be prepared from the corresponding di-amino-salt described in my co-pending application Serial No. 543,969. It crystallised from water in pale yellow needles, M. P. decomp. 247°. It is characterised by a very sparingly soluble nitrate.

*Example III*

By methods essentially analogous to those described in the preceding examples, the amino groups of 2:7-diamino-9-phenyl-10-methylphenanthridinium chloride, and of 3:7-diamino-9-phenyl-10-methylphenanthridinium chloride, may be converted into carbethoxyamido-groups. The products are soluble in water, that from the former giving minute orange needles from that solvent; M. P. decomp. 245°. 3:7-dicarbethoxyamido- 9 - phenyl - 10 - methylphenanthridinium chloride is best crystallised as follows: the salt is dissolved in hot glacial acetic acid and the solution diluted with several volumes of hot water.

On being cooled the solution yielded minute glistening yellow needles, M. P. decomp. 261°.

*Example IV*

In like manner monoamino-quaternary salts of the series may be converted into carbethoxy-amido-compounds. Thus 9-m-aminophenyl-10-methylphenanthridinium chloride was dissolved in water and treated with a small excess of chloroformic ester. The yellow colour of the aqueous solution faded, and white needles of 9-m-carbethoxyamido-10-methylphenanthridinium chloride crystallised out; M. P. decomp. 215°.

I claim:

1. As new products of manufacture, carbalkoxyamido esters of amino - 9 - phenyl-phenanthridinium salts.

2. New trypanocidal agents being phenanthridinium salts having the formula:

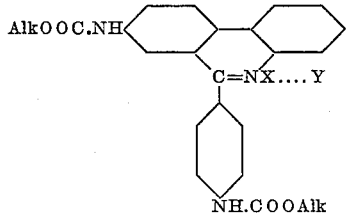

where Alk represents an alkyl group, and X and Y are, respectively, the cation and anion of an alkylating agent.

3. New trypanocidal agents being phenanthridinium salts having the formula:

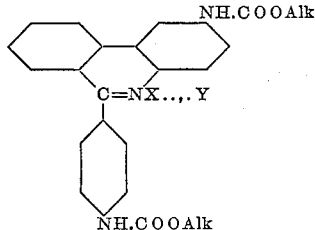

where Alk represents an alkyl group, and where X and Y are respectively the cation and anion of an alkylating agent.

4. New trypanocidal agents being phenanthridinium salts of the general formula:

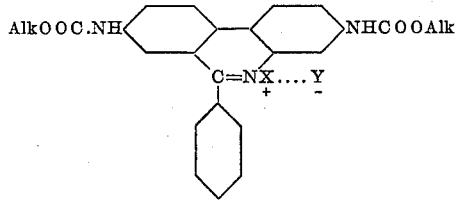

where Alk represents an alkyl group and X and Y are respectively the cation and anion of an alkylating agent.

5. A process for the production of new phenanthridinium salts which comprises reacting an amino-(9-phenyl-phenanthridinium) salt with ethyl chloroformate.

6. A process for the production of new phenanthridinium salts which comprises reacting an amino-(9-phenyl-phenanthridinium) salts in an aqueous medium with a chloroformic ester under agitation and separating the reaction product from the reaction mixture by crystallisation.

7. New trypanocidal agents being di-substituted phenanthridinium salts of the general formula

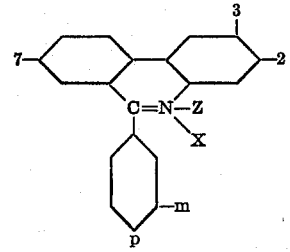

wherein X and Y are respectively the cation and anion of an alkylating agent; and wherein any two of the positions 2–7, 3–7, 7–p, 7–m, 3–p, 3–m, are NHCOOAlk, in pairs and where the unpaired positions are H.

8. Process for producing the substitution compounds of claim 7 by treating a corresponding amino-phenanthridinium salt with a haloformic ester containing the desired ester group.

9. The process for producing di-NHCOOAlk-substituted 9-phenyl-phenanthridinium salts, which comprises treating a corresponding di-amino-phenanthridinium salt with a haloformic ester in aqueous suspension.

10. Process for the production of carbalkoxyamide (9 - phenyl - phenanthridinium) salts, wherein a corresponding amino-9-phenyl-phenanthridinium salt is reacted with a haloformic ester.

11. Process for the production of 3-carbethoxy-amido - 9 - p - carbethoxyamidophenyl - 10-methlyphenanthridinium chloride comprising the reaction of 3-amino-9-p-aminophenyl-10-methyl-phenanthridinium chloride with ethyl chloroformate.

12. 3 - carbethoxyamido - 9 - p - carbethoxy amidophenyl-10-methylphenanthridinium chloride.

13. 7 - carbethoxyamido - 9 - p - carbethoxyamidophenyl-10-methylphenanthridinium chloride.

14. 2:7 - di - carbethoxyamido - 9 - phenyl-10-methylphenanthridinium chloride.

LESLIE PERCY WALLS.

REFERENCES CITED

The following references are of record in the file of this patent:

UNITED STATES PATENTS

| Number | Name | Date |
| --- | --- | --- |
| 2,176,889 | Christiansen et al. | Oct. 24, 1939 |
| 2,267,988 | Morgan et al. | Dec. 30, 1941 |

OTHER REFERENCES

Whitmore: "Organic Chemistry" (1937), page 205.